(12) United States Patent
Miyazaki

(10) Patent No.: US 9,582,175 B2
(45) Date of Patent: Feb. 28, 2017

(54) INFORMATION PROCESSING APPARATUS, INFORMATION PROCESSING METHOD, AND INFORMATION PROCESSING PROGRAM

(75) Inventor: Reiko Miyazaki, Tokyo (JP)

(73) Assignee: Sony Corporation, Tokyo (JP)

( * ) Notice: Subject to any disclaimer, the term of this patent is extended or adjusted under 35 U.S.C. 154(b) by 689 days.

(21) Appl. No.: 13/331,403

(22) Filed: Dec. 20, 2011

(65) Prior Publication Data
US 2012/0179997 A1 Jul. 12, 2012

(30) Foreign Application Priority Data
Jan. 6, 2011 (JP) .............................. P2011-001438

(51) Int. Cl.
| | |
|---|---|
| G06F 3/0486 | (2013.01) |
| G06F 3/0481 | (2013.01) |
| G06F 3/0482 | (2013.01) |
| G06F 3/0484 | (2013.01) |
| G06F 3/0488 | (2013.01) |
| G06F 3/0485 | (2013.01) |

(52) U.S. Cl.
CPC .......... G06F 3/0486 (2013.01); G06F 3/0481 (2013.01); G06F 3/0482 (2013.01); G06F 3/0485 (2013.01); G06F 3/04817 (2013.01); G06F 3/04842 (2013.01); G06F 3/04883 (2013.01); *G06F 2203/04804* (2013.01)

(58) Field of Classification Search
CPC ....... G06F 3/04883; G06F 2203/04808; G06F 3/0481; G06F 3/0482; G06F 3/04817; G06F 3/0486

USPC ......................................... 715/849, 835, 769
See application file for complete search history.

(56) References Cited

U.S. PATENT DOCUMENTS

| | | | | |
|---|---|---|---|---|
| 5,861,886 A | * | 1/1999 | Moran ................ | G06F 3/04842 152/209.1 |
| 2006/0097991 A1 | * | 5/2006 | Hotelling et al. ............ | 345/173 |
| 2007/0186178 A1 | * | 8/2007 | Schiller ................ | G06F 3/0486 715/769 |
| 2008/0307361 A1 | * | 12/2008 | Louch ................... | G06F 3/0481 715/835 |

(Continued)

OTHER PUBLICATIONS

Microsoft Press, "Microsoft Windows User Experience," 1999, pp. 77-81, 85-90, 107-109, 134, 135.*

(Continued)

*Primary Examiner* — Ajay Bhatia
*Assistant Examiner* — Mong-Shune Chung
(74) *Attorney, Agent, or Firm* — Chip Law Group

(57) ABSTRACT

An apparatus includes a display control unit, including a processor, configured to control a display to display a plurality of objects and receive a selection of one of the plurality of objects by a user as a selected object. The display control unit is configured to control the display to move the selected object when a move command is received from the user. The display control unit is configured to control the display to group additionally selected objects with the selected object when additional objects are selected by the user and a group command is received from the user. The display control unit is configured to control the display to independently move the additionally selected objects with respect to the selected object until the additionally selected objects are grouped with the selected object.

18 Claims, 13 Drawing Sheets

(56) References Cited

U.S. PATENT DOCUMENTS

| | | | |
|---|---|---|---|
| 2010/0251124 A1* | 9/2010 | Geppert | G06F 3/04817 715/734 |
| 2011/0084925 A1* | 4/2011 | Baik | G06F 3/04817 345/173 |
| 2011/0087981 A1* | 4/2011 | Jeong | G06F 3/04817 715/765 |
| 2012/0062549 A1* | 3/2012 | Woo | G06F 3/04815 345/419 |

OTHER PUBLICATIONS

Wikipedia, "Thumbnail," Nov. 2010, 3 pages.*
Ronald Ecker, et al., "Visual Cues supporting Direct Touch Gesture Interaction with In-Vehicle Information Systems," Nov. 2010, 8 pages.*

* cited by examiner

LONG PRESS

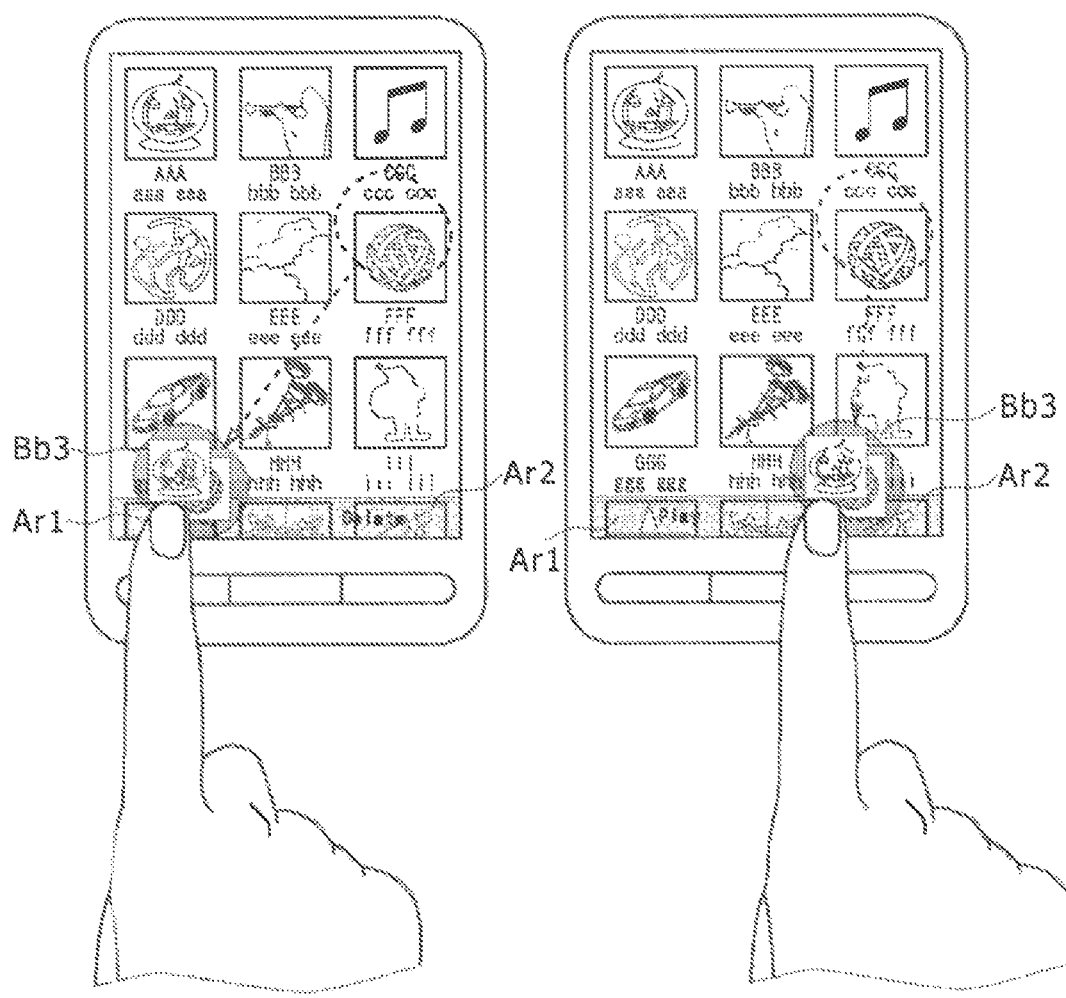

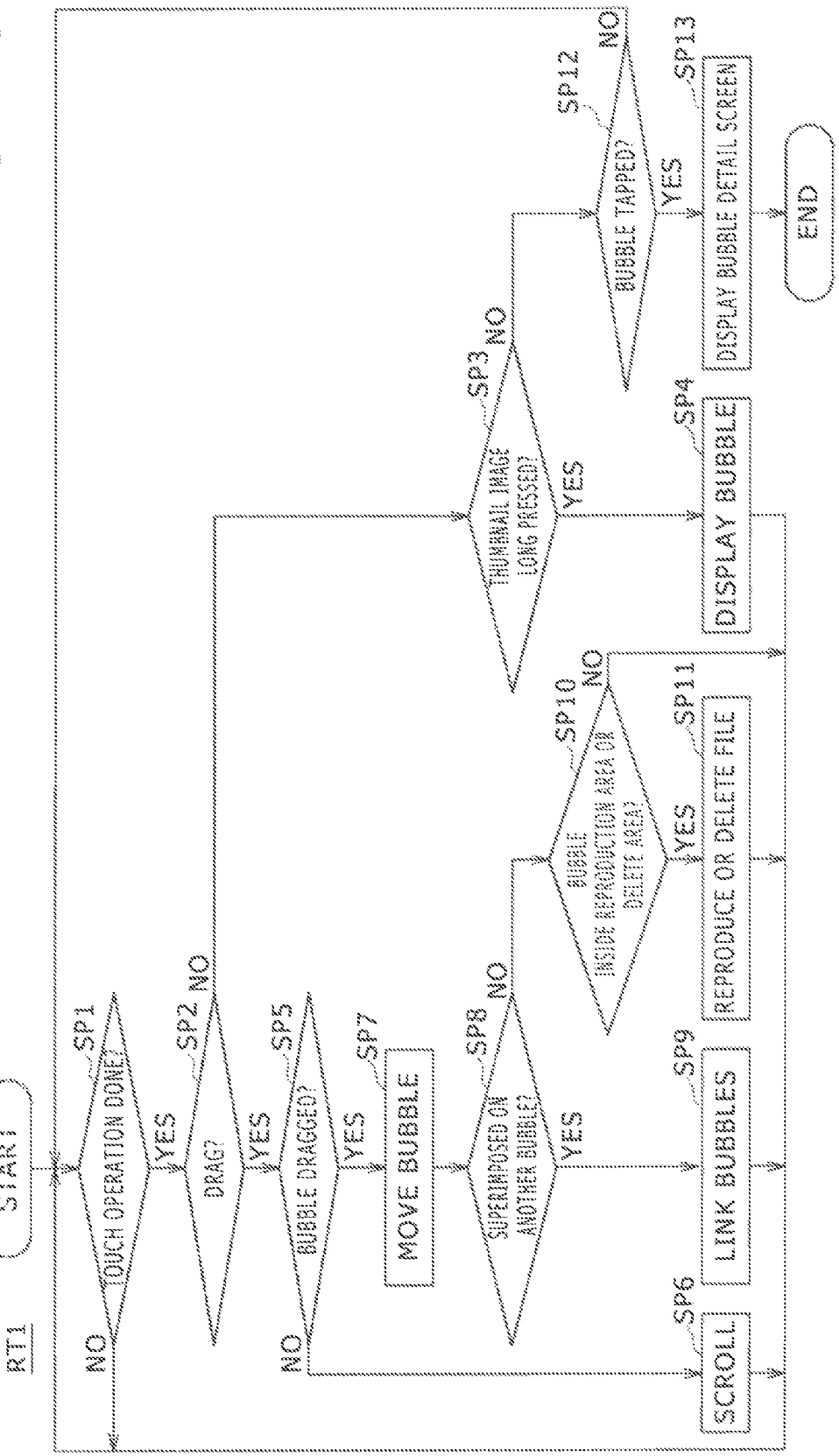

INFORMATION PROCESSING APPARATUS, INFORMATION PROCESSING METHOD, AND INFORMATION PROCESSING PROGRAM

CROSS REFERENCE TO RELATED APPLICATIONS

The present disclosure claims priority to under 35 U.S.C. §119 and contains subject matter related to that disclosed in Japanese Priority Patent Application JP 2011-001438 filed in the Japanese Patent Office on Jan. 6, 2011, the entire content of which is hereby incorporated by reference.

BACKGROUND

The present disclosure relates to an information processing apparatus, an information processing method, and an information processing program that are suitable in application to the graphical user interface (GUI) of information processing apparatuses.

Recently, GUI is installed on many information processing apparatuses. For example, information processing apparatuses having a touch panel have a GUI corresponding to operations that are done through the touch panel.

To be more specific, an information processing apparatus displays an icon (also referred to as a file icon) on a screen thereof corresponding to each of files stored in a storage block thereof. When a user touches a file icon on the screen, a file corresponding to the touched icon is selected (refer to Japanese Patent Laid-open No. 2010-245593 for example).

In addition, many information processing apparatuses having a GUI are configured to classify and sort files on a folder basis.

To be more specific, the information processing apparatus is configured to copy a file corresponding to a file icon on the screen on which the user executes a copy operation. In response to the user operation, the information processing apparatus displays a window (also referred to as a folder window) corresponding to a folder onto the screen and, when the user executes a paste operation, pastes the copied file to this folder.

Executing the above-mentioned processing allows the information processing apparatus to group desired files by copying these files to desired folders, for example.

SUMMARY

However, with existing information processing apparatuses, various operations required for file grouping (a file copy operation, a folder window display operation, and a file paste operation) are cumbersome for users to execute.

Another problem is that, when a group folder window is displayed, a part of the screen is occupied by this window to hide a file icon displayed in the rear of this window, for example.

As described above, it is difficult for existing information processing apparatuses to easily group files.

In other words, if the information, such as files, can be grouped with ease, information processing apparatuses will become more convenience to user than before.

Therefore, the present disclosure addresses the above-identified and other problems associated with existing methods and apparatuses and solves the addressed problems by providing an information processing apparatus, an information processing method, and an information processing program stored on a non-transitory computer readable medium that are configured to be more easily used than before in grouping information.

In carrying out the present disclosure and according to one mode thereof, there is provided an apparatus. Such an apparatus includes a display control unit, including a processor, configured to control a display to display a plurality of objects and receive a selection of one of the plurality of objects by a user as a selected object. The display control unit is configured to control the display to move the selected object when a move command is received from the user. The display control unit is configured to control the display to group additionally selected objects with the selected object when additional objects are selected by the user and a group command is received from the user. The display control unit is configured to control the display to independently move the additionally selected objects with respect to the selected object until the additionally selected objects are grouped with the selected object. The display control unit is configured to control the display to move the additionally selected objects together with the selected object when the additionally selected objects are grouped with the selected object.

According to another mode thereof, there is provided a method. The method includes: controlling a display to display a plurality of objects; receiving a selection of one of the plurality of objects by a user; controlling the display to move the selected object when a move command is received from the user; and controlling the display to group additionally selected objects with the selected object when additional objects are selected by the user. The method further includes: controlling the display to independent move the additionally selected objects with respect to the selected object until the additionally selected objects are grouped with the selected object; and controlling the display to move the additionally selected objects together with the selected object when the additionally selected objects are grouped with the selected object.

According to a further mode thereof, there is provided a non-transitory computer readable medium encoded with a program that, when loaded on a processor, causes the processor to perform a following method. The method includes: controlling a display to display a plurality of objects; receiving a selection of one of the plurality of objects by a user; controlling the display to move the selected object when a move command is received from the user; and controlling the display to group additionally selected objects with the selected object when additional objects are selected by the user. The method further includes: controlling the display to independent move the additionally selected objects with respect to the selected object until the additionally selected objects are grouped with the selected object; and controlling the display to move the additionally selected objects together with the selected object when the additionally selected objects are grouped with the selected object.

As described above and according to the present disclosure, the above-mentioned novel configuration allows any information to be displayed on the screen as a subject of grouping by a simple user operation of only selecting information subject to selection. At the same time, by use of the entire screen, the novel configuration can display the information subject to selection and execute grouping of the information subject to grouping. As a result, the novel configuration significantly enhances the usability (the ease of use by users). Thus, an information processing apparatus, an information processing method, and an information processing program can be realized that are easier for users to use than existing technologies.

BRIEF DESCRIPTION OF THE DRAWINGS

FIGS. 10A and 10B are schematic diagrams for describing the reproduction and deletion of music files on a bubble (or group) basis;

FIG. 13 is a flowchart indicative of a procedure of operation input processing.

DETAILED DESCRIPTION OF THE PREFERRED EMBODIMENTS

The present disclosure will be described in further detail by way of embodiments thereof with reference to the accompanying drawings. The description will be executed in the following order:

1. Overview of embodiments;
2. Specific examples of embodiment; and
3. Variations.

1. Overview of Embodiments

First, embodiments of the present disclosure will be overviewed. Then, the specific examples of these embodiments will be described, followed by the description of variations to the embodiments. It should be noted that the following overview is that of contents including specific examples and variations of the embodiments.

Figure 1:
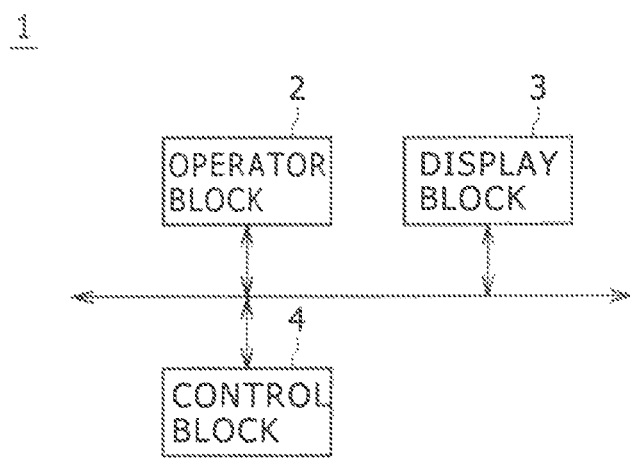
FIG. 1 is a block diagram illustrating an exemplary functional configuration of an information processing apparatus that is an overview of one embodiment of the present disclosure.

In FIG. 1, numeral 1 denotes an information processing apparatus. This information processing apparatus 1 has an operator block 2. The information processing apparatus 1 also has a control block 4 configured to display, on a display 3, a screen made up of a first layer on which information is displayed in a selectable state and a second layer, superimposed on the first layer, which is transparent or translucent for grouping selected information.

When the information displayed on the first layer is selected through the operator block 2, the control block 4 displays the selected information onto the second layer to be grouped.

The above-mentioned configuration allows the displaying of given information onto the screen as a subject of grouping by executing a simple operation of selecting the information to be selected. In addition, the above-mentioned configuration allows the displaying of information subject to selection by use of the entire screen and, at the same time, allows the execution of a job of grouping the information subject to grouping.

Here, it is assumed that the operator block 2 be based on a touch panel that allows the inputting of a user operation by a touch operation by the user. In this case, if the information displayed on the first layer is touched for a predetermined duration of time for example, the control block 4 determines that this information has been selected.

At the same time, the control block 4 may reduce the display of the selected information and display the reduced information onto the second layer in a state where the reduced information is enclosed by an object indicative of a group.

In this case, in response to a drag operation with the inside of the object displayed on the second layer specified as an origin, the control block 4 moves this object on the second layer along with the information inside this object.

In addition, in response to a drag operation with the outside of an object displayed on the second layer specified as an origin, the control block 4 scrolls only the displayed contents of the first layer.

Further, in response to a drag operation, the control block 4 moves an object and, when the object at least touches another object on the second layer, links these two objects to sort the information in these two objects into one group.

Still further, when the object displayed on the second layer is selected through the operator block 2 and, if two or more items of information exist in the selected object, the control block 4 adjusts the display locations of these items of information so as not to be overlapped each other.

The control block 4 arranges an area corresponding to a predetermined instruction on the second layer, moves the object displayed on the second layer into this area in response to a drag operation, and executes processing corresponding to the instruction related with the area on the information existing inside the object.

When a drag operation with the information existing inside the object specified as an origin is executed in a state where the object is selected, the control block 4 moves this information in response to this drag operation. When this information is moved outside the object, the control block 4 removes this information from the group of this object.

On the other hand, the control block 4 may display the selected information on the second layer without enclosing the selected information with the object.

In this case, the control block 4 moves the information on the second layer in response to a drag operation with the information displayed on the second layer specified as the origin, for example.

In addition, the control block 4 scrolls only the display contents of the first layer in response to a drag operation with a location keeping away from the information displayed on the second layer specified as the origin, for example.

Further, in response to a drag operation, the control block 4 moves the information displayed on the second layer and, when this information at least touches another information displayed on the second layer, sorts these two pieces of information in one group.

Still further, in response to a drag operation, the control block 4 moves one of two or more items of information sorted in one group and displayed on the second layer and, when the moved information departs from another information by a predetermined distance or longer, removes this information from this group.

The following describes in detail specific examples of the information processing apparatus 1 having the configuration described above.

2. Specific Examples of Embodiment

2-1. External Configuration of a Portable Terminal

Figure 2:
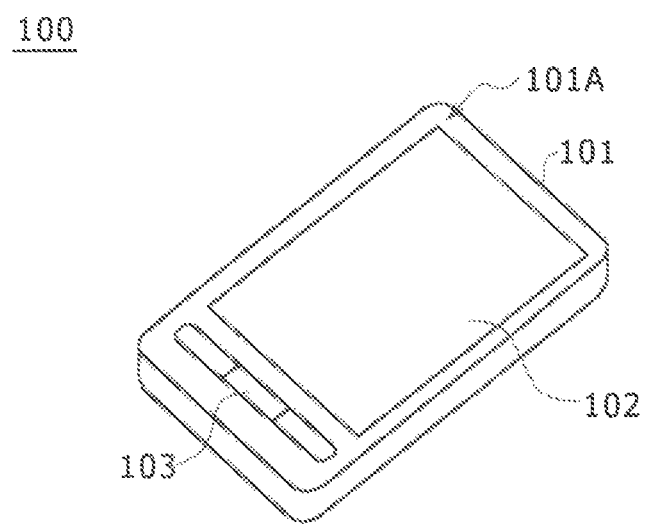
FIG. 2 is a perspective view illustrating an external-view configuration of a portable terminal.

The following describes a specific example of the present embodiment. First, referring to FIG. 2, an external configuration of a portable terminal 100 that is one specific example of the information processing apparatus 1 described above.

The portable terminal 100 has a housing 101 that is approximately flat rectangular in shape and can be held in one hand in size.

At a center section of a front face 101A of the housing 101, a rectangular touch screen 102 is arranged. The touch screen 102 is made up of a liquid crystal panel and a thin, transparent touch panel that covers the liquid crystal panel. It should be noted that this touch panel is based on electrostatic capacitance.

The portable terminal 100 is configured to receive a touch operation done by a user finger (or a so-called touch pen compatible with the electrostatic capacitance touch panel, for example) onto the touch screen 102, as an operation entered by the user.

In addition, on the front face 101A of the housing 101 of the portable terminal 100, operator buttons 103 are arranged near the touch screen 102.

It should be noted that this portable terminal 100 is usable in one of two orientations; the rectangular touch screen 102 held vertical (this is referred to also as a portrait orientation) and laid horizontal (this is referred to also as a landscape orientation).

2-2. Hardware Configuration of the Portable Terminal

Figure 3:
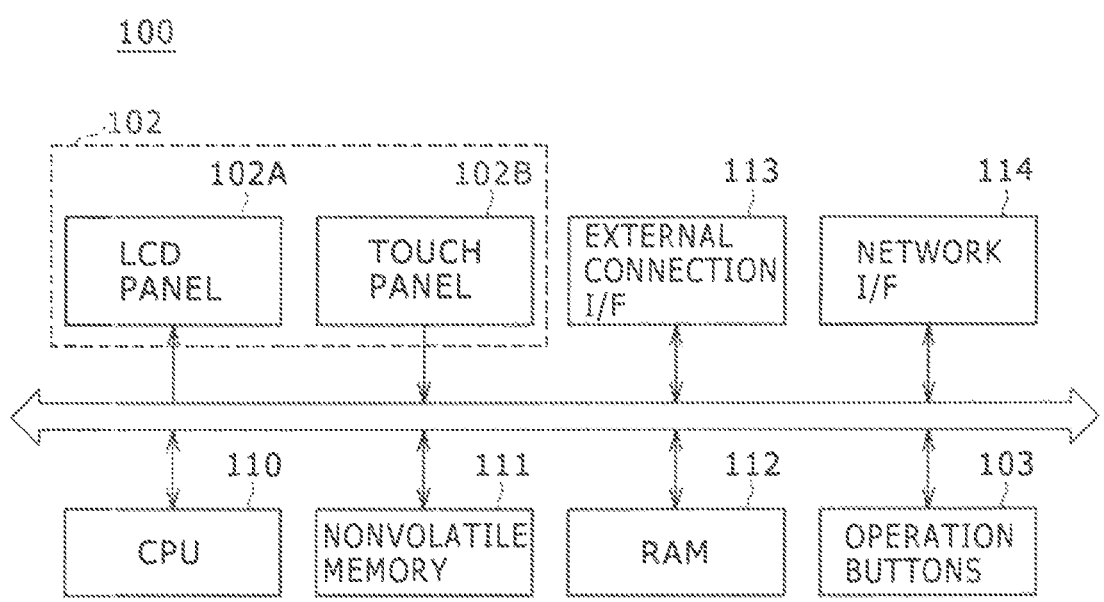
FIG. 3 is a block diagram illustrating a hardware configuration of the portable terminal shown in FIG. 2.

The following describes a hardware configuration of the portable terminal 100 with reference to FIG. 3. With this portable terminal 100, a CPU 110 loads a program from a nonvolatile memory 111 into a RAM 112 to execute various processing operations as instructed by this program and, at the same time, control each component block. It should be noted that CPU is short for Central Processing Unit and RAM is short for Random Access Memory.

The touch screen 102 is made up of a liquid crystal panel 102A that is a display device for displaying various kinds of information and a touch panel 102B that is an operation input device for receiving user operations.

The touch panel 102B has two or more electrostatic sensors (not shown) arranged in a lattice on the operation surface. Each of these sensors changes in output value in accordance with an electrostatic capacity that changes as a conductor, such as an operator finger, approaches the operation surface.

The touch panel 102B transmits an output value of each electrostatic sensor that changes as described above and a location of each electrostatic sensor to the CPU 110.

On the basis of the received output value and location, the CPU 110 identifies an area touched by the user finger (this area is also referred to as a touch area) on the operation surface of the touch panel 102B (namely, on the screen of the liquid crystal panel 102A).

Next, the CPU 110 recognizes the gravity center or the center of the touch area (namely, the gravity center or the center of the touching portion of the operator finger) as a touch location on the screen.

In addition, the CPU 110 acquires the output value and location of each electrostatic sensor from the touch panel 102B every predetermined time to detect a touch location from the touch area, thereby detecting the displacement of the touch locations.

Then, on the basis of the detected displacement, the CPU 110 recognizes how the touch location has moved on the screen (namely, a locus of the touch locations).

On the basis of the touch location and the locus thereof recognized as described above, the CPU 110 identifies a touch operation done onto the screen and receives the identified touch operation as an operation input, thereby executing processing corresponding to this operation input.

It should be noted that CPU 110 is configured to receive, as operation inputs, a touch, a long press (keeping a touch of a location for a predetermined time or longer), a tap (touch and instantaneous detach), a double tap (two consecutive taps), a drag (moving of an image for example across the screen with a user's finger), a flick (moving of something with a sudden movement), and the like.

Also, the portable terminal 100 is compatible with a touch operation with two or more operator fingers (this is also referred to as a multi-touch operation).

Actually, if there are two or more touch areas, the CPU 110 detects a touch location from each of the two or more touch areas. Then, on the basis of the touch locations and loci thereof, the CPU 110 identifies a multi-touch operation done onto the screen and receives this multi-touch operation as an operation input, thereby executing processing corresponding to this operation input.

It should be noted that the CPU 110 is also configured to receive, as operation inputs, multi-touch operations such as a pinch-in (narrowing the distance between two fingers touching an object), a pinch-out (widening the distance between two fingers touching an object), and the like.

Further, upon recognition of a press operation done on the operator button 103, the CPU 110 receives this press operation as an operation input to execute processing corresponding to this operation input.

By transmitting and receiving various items of data via an external connection interface 113 with an external device connected by cable connection, the CPU 110 executes communication processing.

Also, by transmitting and receiving various items of data with an external device connected to a network via network interface 114, the CPU 110 executes communication processing.

It is assumed here that the user double-tap a desired thumbnail image while thumbnail images of images stored in a nonvolatile memory 111 as an image file displayed in a list on the touch screen 102.

Then, the CPU 110 receives this touch operation as an operation input for reproducing an image, thereby reading an image file corresponding to the double-tapped thumbnail image.

If a corresponding image file is a still-image file, then the CPU 110 extracts still-image data from this still-image file. Next, the CPU 110 executes predetermined reproduction processing such as decoding and digital-to-analog conversion on the extracted still-image data to obtain a still-image signal, displaying the obtained still-image signal onto the liquid crystal panel 102A of the touch screen 102.

On the other hand, if the corresponding image file is a moving-image file, then the CPU 110 separates moving-image data and audio data from this moving-image file. Next, the CPU 110 executes predetermined reproduction processing such as decoding and digital-to-analog conversion on the extracted moving-image data to obtain a moving-image signal, displaying the obtained moving-image data on the liquid crystal panel 102A of the touch screen 102. At the same time, the CPU 110 executes predetermined reproduction processing such as decoding, digital-to-analog conversion processing, and amplification processing onto the audio data to obtain an audio signal, outputting the obtained audio signal from a headphone terminal (not shown).

As described above, the portable terminal 100 is configured to reproduce an image specified by the user.

It is also assumed that the user double-tap a desired thumbnail image while thumbnail images of jacket images of music titles stored in a nonvolatile memory 111 as a music file displayed in a list on the touch screen 102, for example.

The CPU 110 receives this tap operation as an operation input for reproducing music to read a music file corresponding to the double-tapped thumbnail image from the nonvolatile memory 111.

The CPU 110 extracts audio data from this music file. Then, the CPU 110 executes reproduction processing such as decoding, digital-to-analog conversion processing, and amplification processing onto the extracted audio data to obtain an audio signal, outputting the obtained audio signal from the headphone terminal (not shown).

As described above, the portable terminal 100 is configured to reproduce the music specified by the user.

At the same time, the CPU 110 acquires such associated information as jacket photograph, music title, album title, and artist name, for example, from the read music file and displays the obtained associated information onto the liquid crystal panel 102A of the touch screen 102.

As described above, the portable terminal 100 reproduces the music specified by the user and, at the same time, displays the information associated with the reproduced music.

In addition, the portable terminal 100 is configured to select a file for grouping by a simple operation. The following describes a file grouping operation procedure.

It should be noted that the example of the specific hardware of the operator block 2 of the information processing apparatus 1 as described above in the overview of the embodiment is the touch panel 102B of the portable terminal 100 described above. The specific hardware example of the control block 4 of the information processing apparatus 1 is the CPU 110 of the portable terminal 100 described above. The specific hardware example of the display block 3 of the information processing apparatus 1 is the liquid crystal panel 102A of the portable terminal 100 described above.

2-3. File Grouping

The following describes a case where a music file is selected for grouping of example. The grouping of a music file can be executed through a music list screen 200 shown in FIG. 4.

Figure 4:
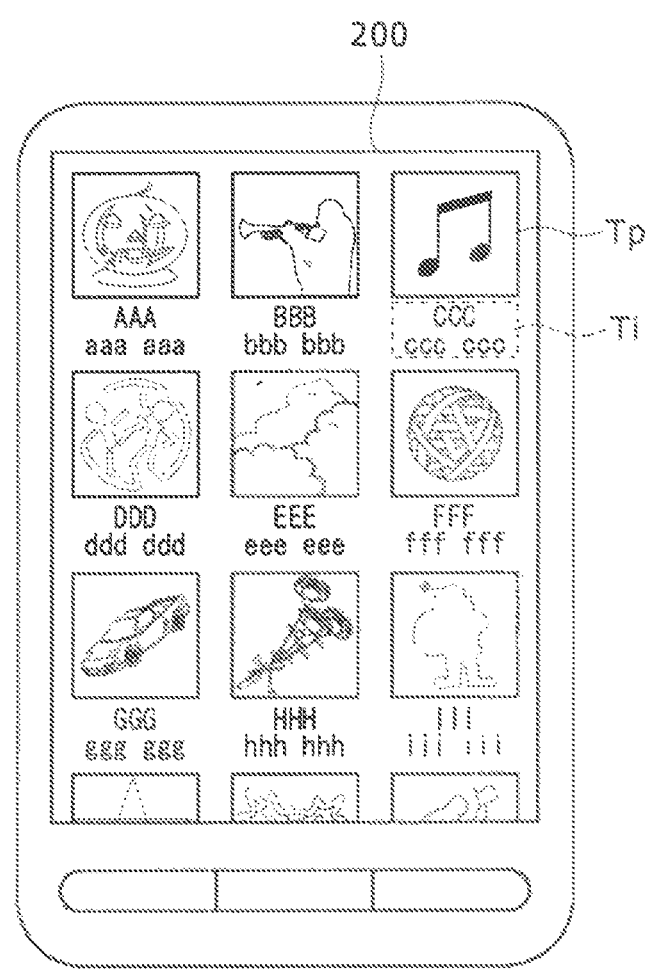
FIG. 4 is a schematic diagram illustrating configuration (1) of a music list screen.

It should be noted that the music list screen 200 shown in FIG. 4 is a display example in which the portable terminal 100 is used in the vertical orientation and therefore the music list screen 200 is displayed as a portrait screen on the entire of the touch screen 102.

Figure 5:
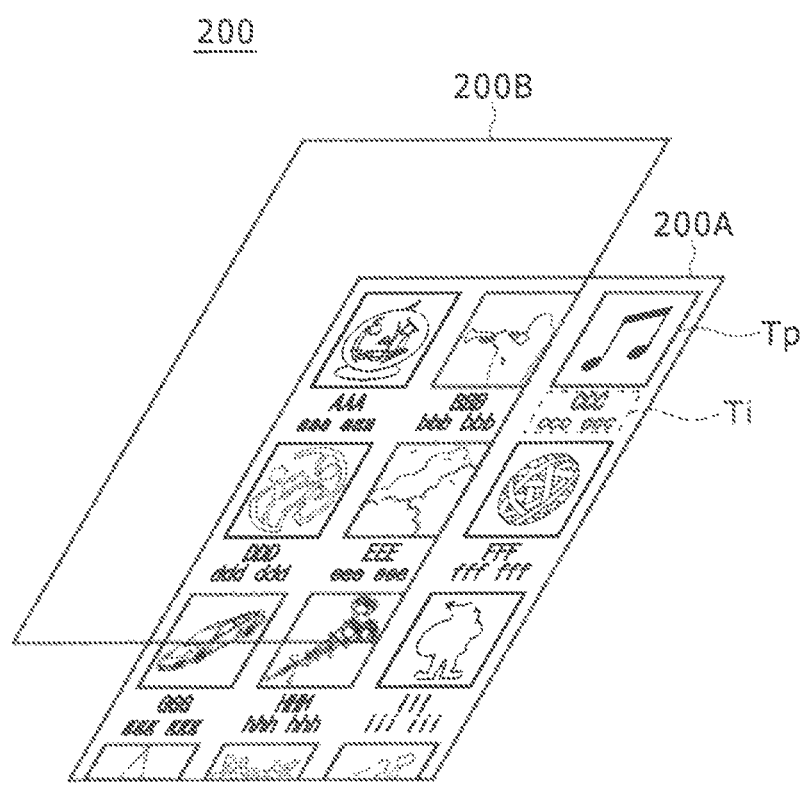
FIG. 5 is a schematic diagram illustrating configuration (2) of a music list screen.

This music list screen 200 is configured that two vertical sheets called layers are stacked as shown in FIG. 5, the music list screen 200 being virtually layered by these two layers in the vertical direction of the screen. In some embodiments of the present invention, the two layers are physically separate layers. In other embodiments, the two layers are virtual layers on a single screen.

Of these two layers, the lower layer (also referred to as a first layer) 200A is configured to display, in a list form, thumbnail images Tp of jacket photographs of the music stored in the volatile memory 111 as a music file.

To be more specific, the first layer 200A displays thumbnail images Tp for each music file as the subject to selection. Therefore, the selection of the thumbnail images Tp and the selection of the music file are synonymous and the grouping of thumbnail images Tp and the grouping of music files are also synonymous.

It should be noted that the first layer 200A may display text information Ti such as music titles and artist names corresponding to thumbnail images Tp in the proximity of (below, for example) thumbnail images Tp along with thumbnail images Tp. Actually, FIG. 5 shows an example in which text information Ti is displayed on the first layer 200A along with thumbnail images Tp.

On the other hand, the upper layer (also referred to as a second layer) 200B is transparent and colorless through which the display contents (thumbnail images Tp and text information Ti) of the first layer 200A can be seen without change.

Further, the second layer 200B is configured to display a thumbnail image Tp enclosed in a bubble-like object (also referred as a bubble) selected from the thumbnail images Tp displayed on the first layer 200A, details thereof to be descried later. It should be noted that there is nothing displayed on the second layer 200B shown in FIG. 5. Although FIG. 5 depicts the bubble as a circle, selection objects having any other shape are also within the scope of the present invention.

The CPU 110 is configured to display the music list screen 200 made up of these two layers onto the touch screen 102.

Actually, this music list screen 200 is displayed on the touch screen 102 with thumbnail images Tp for each music file list-displayed on the first layer 200A along with text information Ti and nothing displayed on the second layer 200B.

The first layer 200A can display a total of nine (vertical 3×horizontal 3) thumbnail images Tp can be list-displayed at once along with text information Ti, any excess thumbnail images being vertically scrolled to be displayed.

To be more specific, when a drag operation is executed in the vertical direction of the screen on the music list screen 200, then the CPU 110 accordingly scrolls the thumbnail images Tp and text information Ti displayed on the first layer 200A in the vertical direction of the screen.

As described above, by vertically scrolling the display contents of the first layer 200A, the music list screen 200 can display the thumbnail images Tp and text information Ti of all music titles stored in the volatile memory 111 as a music file.

It should be noted that, as described above, the music list screen 200 is virtually layered by the two sheets, the upper or second layer 200B being transparent and colorless allowing the display contents of the lower or first layer 200A to be seen without change. Consequently, the music list screen 200 allows the user to execute a touch operation with substantially the same operational feeling as that provided by an ordinary screen made up of a single layer without making the user aware that the music list screen 200 has a layer structure.

Figure 6A:
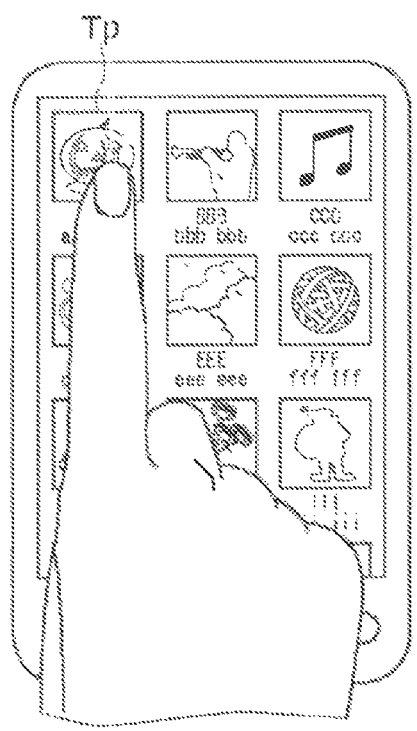
FIGS. 6A and 6B are schematic diagrams for describing bubble display (1)

As shown in FIG. 6A, it is assumed that the user long press one of thumbnail images Tp displayed on the first layer 200A of the music list screen 200.

Then, the CPU 110 receives this touch operation as an operation input for selecting the thumbnail image Tp and recognizes that the long pressed thumbnail image Tp is the thumbnail image Tp selected by the user.

Figure 6B:
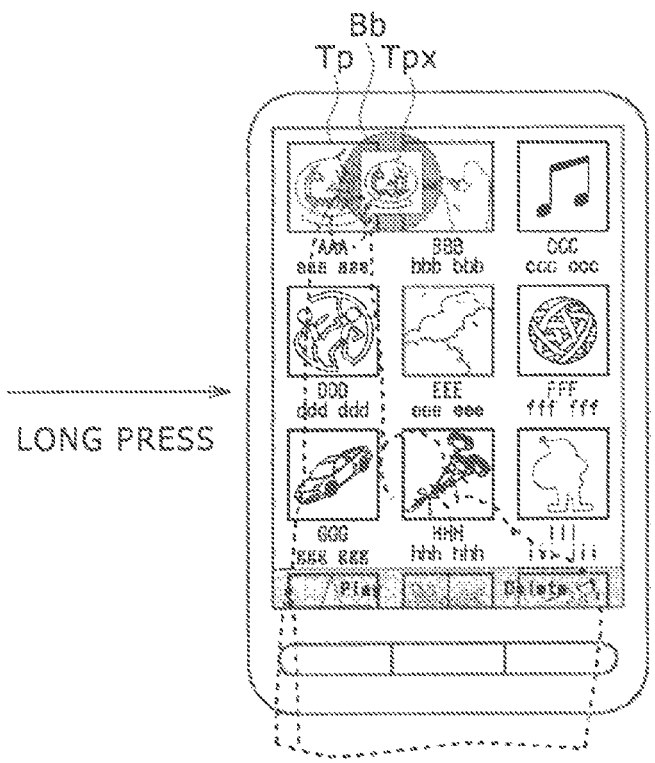
Figure 7:
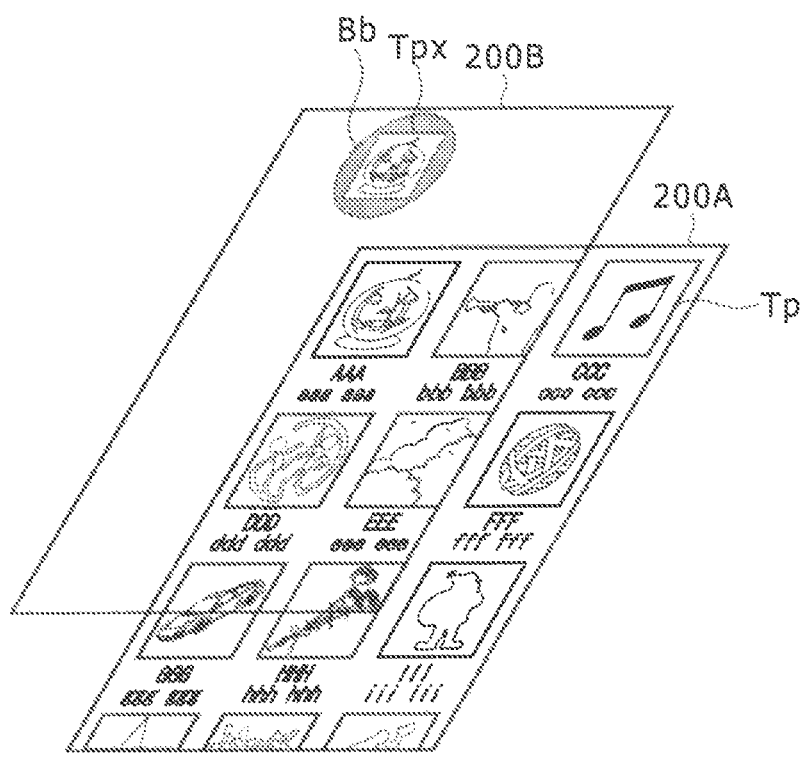
FIG. 7 is a schematic diagram for describing bubble display (2)

Next, the CPU 110 reduces the selected thumbnail image Tp with a predetermined reduction ratio (50% for example). Then, as shown in FIG. 6B and FIG. 7, the CPU 110 encloses the thumbnail image that has been reduced (also referred to as a reduced thumbnail image) Tpx in a light-blue translucent bubble Bb, which is displayed at the long pressed location (or in the proximity thereof) on the second layer 200B.

When a thumbnail image Tp is selected from the first layer 200A as described above, the music list screen 200 encloses the reduced thumbnail image Tpx obtained by reducing the selected thumbnail image Tp, thereby displaying the enclosed thumbnail image onto the second layer 200B.

This novel configuration allows the user to easily recognize every selected thumbnail image Tp.

In addition, by dragging a bubble Bb, the music list screen 200 can move the bubble Bb to a desired location along with the reduced thumbnail image Tpx enclosed in the bubble.

It should be noted that, as shown above, a drag operation also corresponds to the scrolling of the first layer 200A. Therefore, the CPU 110 is configured to make distinction between a drag operation for moving bubble Bb and a drag operation for scrolling the first layer 200A depending on the start position of each drag operation.

To be more specific, if a drag operation with the inside of a bubble Bb specified as a start location is executed, the CPU 110 recognizes this drag operation as a touch operation for moving the bubble Bb. On the other hand, if a drag operation is executed in the vertical direction with the outside of a bubble Bb specified as a start location, then the CPU 110 recognizes this drag operation as a touch operation for scrolling the display contents of the first layer 200A.

As described above, on the music list screen 200, the movement of a bubble Bb and the scroll of the first layer 200A can be exclusively executed depending on the start locations of drag operations.

Further, the music list screen 200 is configured to allow the selection of a thumbnail image Tp displayed on the first layer 200A while keeping a reduced thumbnail image Tpx enclosed in a bubble Bb displayed on the second layer 200B.

To be more specific, when a drag operation is executed in the vertical direction of the screen with the outside of a bubble Bb specified as a start location, the CPU 110 accordingly scrolls the display contents (thumbnail image Tp and text information Ti) of the first layer 200A in the vertical direction of the screen.

At this time, the CPU 110 does not scroll the second layer 200B. Therefore, on the music list screen 200, only the thumbnail image Tp and the text image Ti displayed on the first layer 200A are scrolled with the location of the reduced thumbnail Tpx enclosed in bubble Bb displayed on the second layer 200B left unchanged.

Consequently, while checking the currently selected thumbnail image Tp by checking the reduced thumbnail image Tpx enclosed in bubble Bb, the user can scroll a thumbnail image Tp subject to selection, thereby searching for a thumbnail image Tp to be selected next.

Next, it is assumed that the user have found a desired thumbnail image Tp from the first layer 200A and long press this thumbnail image Tp.

Then, the CPU 110 recognizes the long pressed thumbnail image Tp as a thumbnail image Tp selected by the user.

It should be noted that, at this time, the reduced thumbnail image Tpx enclosed in bubble Bb is left displayed on the second layer 200B, so that a desired thumbnail image Tp displayed on the first layer 200A may be hidden under the reduced thumbnail image Tpx, thereby becoming unselectable by the user.

If this happens, the user may move the reduced thumbnail image Tpx enclosed in bubble Bb therewith or scroll the display contents on the first layer 200A, thereby shifting the location of a desired thumbnail image Tp and the location of the reduced thumbnail image Tpx from each other.

Recognizing the thumbnail image Tp selected by the user, the CPU 110 encloses a reduced thumbnail image Tpx obtained by reducing this recognized thumbnail image Tp in a new bubble Bb and displays the enclosed thumbnail image Tpx at the long pressed location (or the proximity thereof) on the second layer 200B.

Figure 8:
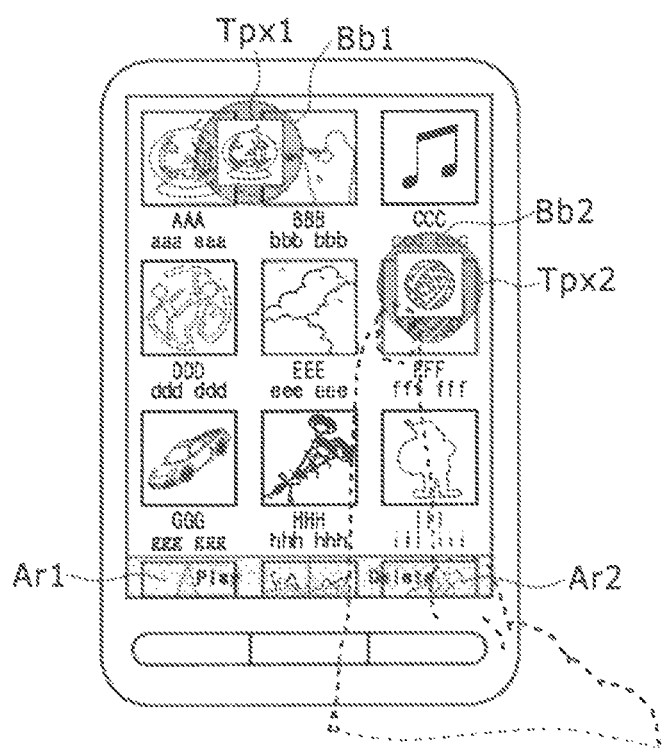
FIG. 8 is a schematic diagram for describing bubble display (3)

As a result, two reduced thumbnail images Tpx (Tpx1 and Tpx2) are displayed as enclosed in different bubbles Bb (Bb1 and Bb2) on the music list screen 200 as shown in FIG. 8 for example.

As described above, every time a thumbnail image Tp is selected from the first layer 200A, the CPU 110 encloses the reduced thumbnail image Tpx obtained by reducing the selected thumbnail image Tp in a bubble Bb and displays the enclosed reduced thumbnail image on the second layer 200B.

It should be noted that, on the music list screen 200, each bubble Bb is indicative of a group and each reduced thumbnail image Tpx is grouped by the bubble Bb in which the reduced thumbnail image Tpx is enclosed.

For example, in the case of the music list screen 200 shown in FIG. 8, the reduced thumbnail image Tpx1 enclosed in the bubble Bb1 is sorted into the group of this bubble Bb1 and the reduced thumbnail image Tpx enclosed in the bubble Bb2 is sorted into the group of this bubble Bb2.

Further, on the music list screen 200, two or more bubbles Bb can be linked into one, thereby integrating two or more reduced thumbnail images Tpx sorted in different groups into the same group.

To be more specific, on the music list screen 200, by moving a desired bubble Bb by a drag operation to a location where this bubble Bb is superimposed on (or touches) a bubble Bb to be linked with the desired bubble Bb, these two bubbles Bb can be linked into one.

Figures 9A, 9B:
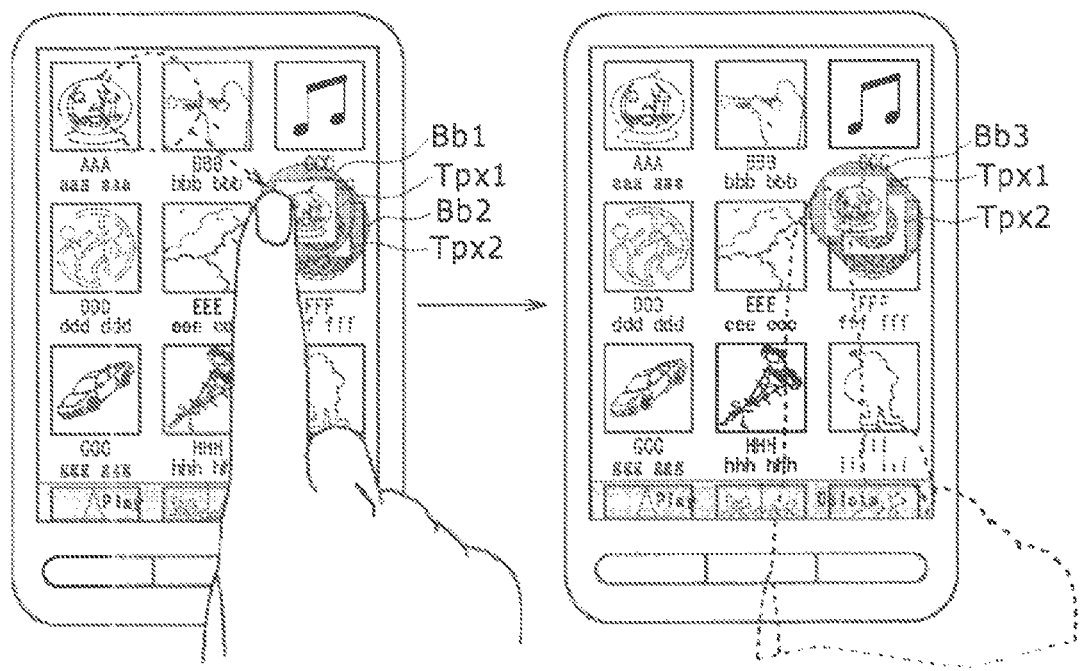
FIGS. 9A and 9B are schematic diagrams for describing the linking of bubbles.

It is assumed here that, as shown in FIG. 9A, a bubble Bb1 enclosing a reduced thumbnail image Tpx1 be moved by a drag operation to a location where the bubble Bb1 is superimposed on (or touches) a bubble Bb2 enclosing a reduced thumbnail image Tpx2, upon which the drag operation is released.

Then, the CPU 110 recognizes that a touch operation for linking the bubble Bb1 and the bubble Bb2 has been executed and encloses the two reduced thumbnail images Tpx1 and Tpx2 in a bubble Bb3 obtained by linking the bubble Bb1 and the bubble Bb2 together.

As a result, the reduced thumbnail images Tpx1 and Tpx2 so far sorted in different groups are integrated into the same group of the bubble Bb3.

Further, the bubble Bb3 enclosing the reduced thumbnail images Tpx as described above can be moved by a drag operation with these reduced thumbnail images to be linked with still another bubble Bb.

As described above, the music list screen 200 allows the grouping of reduced thumbnail images Tpx (namely, selected thumbnail images Tp) displayed on the second layer 200B.

In addition, on the second layer 200B of the music list screen 200, two areas Ar1 and Ar2 are horizontally displayed in the bottom section during a time in which a bubble Bb is in a touched state as shown in FIG. 8.

The left area Ar1 is related with an instruction for reproducing a music file and the right area Ar2 is related with an instruction for deleting a music file. Therefore, here, the left area Ar1 is referred to as a reproduction area Ar1 and the right area Ar2 is referred to as a delete area Ar2.

On the music list screen 200, by moving a desired bubble Bb by a drag operation into the reproduction area Ar1, a music file corresponding to a reduced thumbnail image Tpx sorted in the group of this bubble Bb can be reproduced.

It is assumed here that, as shown in FIG. 10A, the bubble Bb3 be moved by a drag operation into the reproduction area Ar1 along with the reduced thumbnail images Tpx1 and Tpx2 enclosed in the bubble Bb3, upon which the drag operation is released.

Then, the CPU 110 sequentially reproduces a music file corresponding to the reduced thumbnail image Tpx1 and a music file corresponding to the reduced thumbnail image Tpx2 sorted in the group of the bubble Bb3.

In addition, on the music list screen 200, by moving a desired bubble Bb by a drag operation into the delete area Ar2, a music file corresponding to the reduced thumbnail image Tpx sorted in the group of this bubble Bb can be deleted.

It is assumed here that, as shown in FIG. 10B, the bubble Bb3 is moved by a drag operation into the delete area Ar2 along with the reduced thumbnail images Tpx1 and Tpx2 enclosed in the bubble Bb3, upon which the drag operation is released.

Then, The CPU 110 deletes a music file corresponding to the reduced thumbnail image Tpx1 and a music file corresponding to the reduced thumbnail image Tpx2 sorted in the group of the bubble Bb3 from the volatile memory 111.

As described above, the portable terminal 100 is configured to reproduce or delete, a group basis, a music file corresponding to a reduced thumbnail image Tpx grouped on the music list screen 200.

Further, the portable terminal 100 is also configured to sort two or more reduced thumbnail images Tpx of the same group into different groups.

It is assumed here that the user have actually tapped one the bubble Bb displayed on the music list screen 200.

Then, the CPU 110 receives this touch operation as an operation input for selecting a bubble Bb and recognizes that the bubble Bb tapped by the user is the bubble Bb selected by the user.

Figure 11:
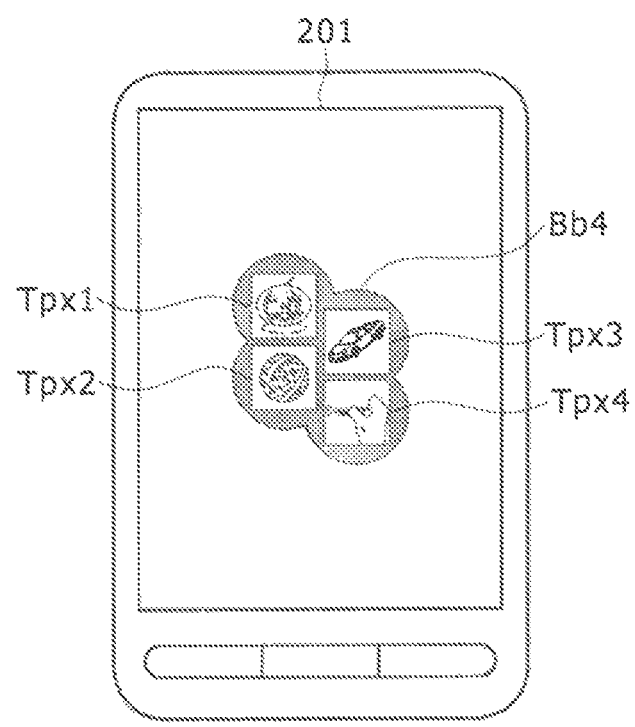
FIG. 11 is a schematic diagram indicative of a configuration of a bubble detail screen.

Next, the CPU 110 switches the display on the touch screen 102 to a bubble detail screen 201 indicative of details of the selected bubble Bb as shown in FIG. 11.

This bubble detail screen 201 displays only the selected bubble Bb and a reduced thumbnail image Tpx enclosed in this bubble.

It should be noted here that the display location of each thumbnail image Tpx is basically the same as the display location on the music list screen 200, both the display locations being adjusted so as not to overlap each other.

As described above, the bubble detail screen 201 displays the reduced thumbnail images Tpx enclosed in a bubble Bb so as not to overlap each other, there allowing the user to easily recognize each reduced thumbnail image Tpx from others.

In addition, this bubble detail screen 201 is configured to move, by a drag operation, each of the reduced thumbnail images Tpx enclosed in a bubble Bb independently of other reduced thumbnail images Tpx enclosed in the bubble Bb.

On the basis of the above-mentioned function, the bubble detail screen 201 can move a desired reduced thumbnail image Tpx by a drag operation outside the bubble Bb, thereby sorting this reduced thumbnail image Tpx into another group.

It is assumed here that, as shown in FIG. 11, four reduced thumbnail images Tpx1 through Tpx4 be displayed as enclosed in one bubble Bb4 on the bubble detail screen 201, for example.

Figures 12A, 12B:
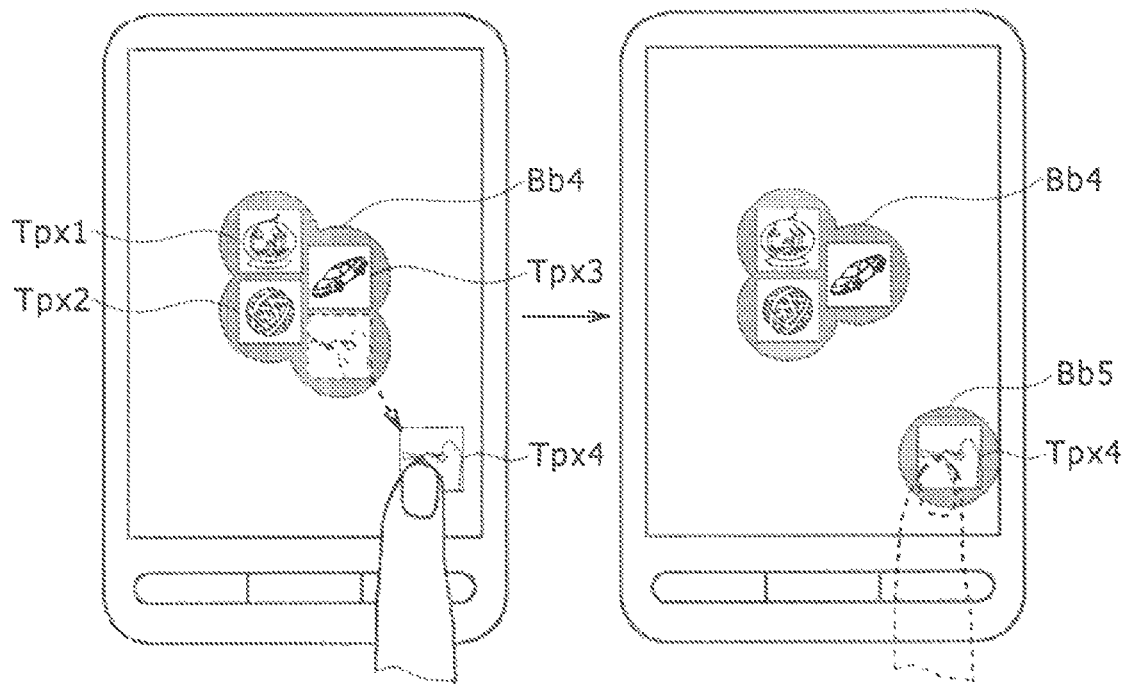
FIGS. 12A and 12B are schematic diagrams for describing the separation of bubbles.

It is assumed again here that, as shown in FIG. 12A, the reduced thumbnail image Tpx4 be moved, by a drag operation, outside the bubble Bb4, upon which the drag operation is released, for example.

Then, the CPU 110 encloses this reduced thumbnail image Tpx4 in another bubble Bb5 different from the bubble Bb4, thereby removing the reduced thumbnail image Tpx4 from the bubble Bb4 as shown in FIG. 12B.

As a result, the reduced thumbnail image Tpx4 is sorted in a group other than the group of the reduced thumbnail images Tpx1 through Tpx3.

Subsequently, if a location at which nothing is displayed on the bubble detail screen 201, the CPU 110 returns the display of the touch screen 102 to the music list screen 200.

At this time, the CPU 110 updates the display contents of the music list screen 200 in accordance with the grouping on the bubble detail screen 201.

To be more specific, the CPU 110 separates and distances the display locations of the reduced thumbnail images Tpx1 through Tpx3 and the reduced thumbnail image Tpx4 from each other, and respectively encloses these thumbnail images in the bubble Bb4 and the bubble Bb5.

As described above, the portable terminal 100 can sort two or more reduced thumbnail images Tpx sorted in the same group into different groups.

It should be noted that, when a thumbnail image Tp displayed on the first layer 200A of the music list screen 200 is double-tapped, the CPU 110 can immediately reproduces a music file corresponding to the double-tapped thumbnail image Tp.

As described above, the portable terminal 100 displays, on the touch screen 102, the music list screen 200 with the transparent second layer 200B superimposed on the first layer 200A.

Of the two layers, the portable terminal 100 displays a thumbnail image Tp corresponding to each file onto the lower first layer 200A as a subject of selection.

Then, when one of the thumbnail images Tp displayed on the first layer 200A is long pressed for selection, the portable terminal 100 displayed the selected thumbnail image Tp onto the second layer 200B, making this thumbnail image Tp subject to grouping.

As described above, a simple operation of long pressing a thumbnail image Tp allows the portable terminal 100 to make any thumbnail image Tp subject to grouping and display this thumbnail image on the music list screen 200.

Further, the portable terminal 100 reduces the thumbnail image Tp selected from the first layer 200A and displays the reduced thumbnail image as enclosed in a bubble Bb indicative of a group, rather than displaying on the second layer 200B without change.

Consequently, the portable terminal 100 can make the user easily identify the thumbnail image Tp selected to be subject to grouping from the other thumbnail images Tp.

In addition, the portable terminal 100 moves the bubble Bb along with the reduced thumbnail image Tpx enclosed therein by a drag operation. When the bubble Bb has been moved to a location where this bubble overlaps or (touches) another bubble Bb, the portable terminal 100 links these two bubbles together.

As a result, the reduced thumbnail images Tpx enclosed in the different bubbles Bb are put in the same bubble Bb to be sorted in the same group. Namely, the thumbnail images Tp sorted in different groups are sorted in the same group.

As described above, the portable terminal 100 can organize thumbnail images Tp sorted in different groups into the same group by executing a simple operation of overlapping (or touching) bubbles Bb in which reduced thumbnail images Tpx are enclosed.

In addition, the portable terminal 100 displays a thumbnail image Tp which is a subject of selection on the lower first layer 200A making up the music list screen 200 and the thumbnail image Tp selected from the first layer 200A onto the upper second layer 200B as the subject for grouping.

Consequently, the portable terminal 100 can display the subjects of selection by use of the entire screen and, at the same time, display the subjects of grouping by use the entire screen, thereby allowing the user to efficiently execute a grouping operation.

Further, when the bubble Bb displayed on the second layer 200B is tapped, the portable terminal 100 displays the bubble detail screen 201 indicative of the details of the tapped bubble Bb onto the touch screen 102.

Here, the portable terminal 100 displays only the tapped bubble Bb and the reduced thumbnail image Tpx enclosed in this bubble Bb onto the bubble detail screen 201.

Then, the portable terminal 100 moves the reduced thumbnail image Tpx by a drag operation. When the reduced thumbnail image Tpx has been moved outside of the bubble Bb, the portable terminal 100 encloses this reduced thumbnail image Tpx in a new bubble Bb, separating this reduced thumbnail image from the original bubble Bb.

As a result, this reduced thumbnail image Tpx is removed from the original group and sorted in another group. Namely, the thumbnail image Tp is removed from the original group to be sorted in another group.

As described above, by a simple operation of moving a reduced thumbnail image Tpx out of a bubble Bb, the portable terminal 100 can remove the thumbnail image Tp corresponding to this reduced thumbnail image Tpx from the original group and sort the removed thumbnail image Tp into another group.

2-4. Operation Input Processing Procedure

The following describes a specific processing procedure to be executed in accordance with an operation input specified by a touch operation (this procedure is referred to as an operation input processing procedure) while the portable terminal 100 is displaying the music list screen 200 with reference to the flowchart shown in FIG. 13.

It should be noted that operation input processing procedure RT1 shown in FIG. 13 is executed by the CPU 110 of the portable terminal 100 as instructed by a program stored in the volatile memory 111.

Displaying the music list screen 200 onto the touch screen 102, the CPU 110 starts this operation input processing procedure RT1, upon which the procedure goes to step SP1.

In step SP1, the CPU 110 waits for a touch operation that is executed by the user through the touch panel 102B. When a touch operation is executed and the result of this step SP1 is affirmative, then the CPU 110 moves to step SP2.

In step SP2, the CPU 110 determines whether or not this touch operation is a drag operation.

If the result of this step SP2 is negative, then the CPU 110 moves to the SP3. In step SP3, the CPU 110 determines whether or not this touch operation is a long press operation onto a thumbnail image Tp displayed on the first layer 200A.

If the result of this step SP3 is affirmative, then the CPU 110 moves to step SP4. In step SP4, the CPU 110 recognizes that the long pressed thumbnail image Tp is the thumbnail image Tp selected by the user. Next, the CPU 110 displays a reduced thumbnail image Tpx obtained by reducing the selected thumbnail image Tp as enclosed in a bubble Bb onto the second layer 200B and returns to step SP1.

On the other hand, if the result of step SP2 is affirmative, it indicates that the touch operation is a drag operation. Then, the CPU 110 moves to step SP5.

In step SP5, the CPU 110 determines whether or not the drag operation is for the bubble Bb displayed on the second layer 200B.

If the result of this step SP5 is negative, it indicates that this drag operation is for scrolling the display contents of the first layer 200A. Then, the CPU 110 moves to step SP6 and scrolls the display contents of the first layer 200A in response to the drag operation and then returns to step SP1.

On the other hand, if the result of step SP5 is affirmative, it indicates that this drag operation is for the bubble Bb displayed on the second layer 200B. Then, the CPU 110 moves to step SP7 to move the bubble Bb in response to the drag operation and then moves to step SP8.

In step SP8, the CPU 110 determines as a result of the movement of the bubble Bb whether or not this bubble Bb has been superimposed on (or touching) another bubble Bb, namely, whether or not the move destination of the bubble Bb is another bubble.

If the result of step SP8 is affirmative, then the CPU 110 moves to step SP9 to link the overlapping (or touching) two bubbles and then returns to the step SP1.

On the other hand, if the result of step SP8 is negative, it indicates that the move destination of this bubble Bb is not another bubble Bb. Then, the CPU 110 moves to step SP10.

In step SP10, the CPU 110 determines whether or not the move destination of the bubble Bb is the inside of reproduction area Ar1 or delete area Ar2.

If the result of the step SP10 is affirmative, then the CPU 110 moves to step SP11 to reproduce or delete a file corresponding to the reduced thumbnail image Tpx enclosed in the bubble Bb and returns to step SP1.

By contrast, if the result of step SP10 is negative, it indicates that the move destination of this bubble Bb is neither another bubble Bb nor the inside of reproduction area Ar1 or delete area Ar2. Then, the CPU 110 returns to step SP1.

On the other hand, if the result of step SP3 is negative, it indicates that this touch operation is neither a drag operation nor a long press of thumbnail image Tp. Then the CPU 110 moves to step SP12.

In step SP12, the CPU 110 determines whether or not this touch operation is a tap onto the bubble Bb displayed on the second layer 200B.

If the result of step SP12 is negative, it indicates that this touch operation is neither a drag operation, nor a long press onto thumbnail image Tpx or a tap onto a bubble Bb. Then, the CPU 110 returns to step SP1.

If the result of step SP12 is affirmative, it indicates that this touch operation is a tap onto a bubble Bb. Then, the CPU 110 moves to step SP13 to display the bubble detail screen 201 indicative of the details of the tapped bubble Bb onto the touch screen 102, thereby terminating this operation input processing procedure RT1.

In accordance with the operation input processing procedure RT1 described above, the CPU 110 of the portable terminal 100 executes processing in response to an operation input causing by a touch operation done by the user onto the music list screen 200.

2-5. Operations and Effects

In the configuration described above, the CPU 110 of the portable terminal 100 displays the music list screen 200 made up of the first layer 200A and the transparent second layer 200B superimposed thereon onto the touch screen 102.

Further, the CPU 110 displays a thumbnail image Tp of each music file onto the first layer 200A as a subject of selection.

Next, when one of the thumbnail images Tp displayed on the 200A is selected by a long press operation, the CPU 110 reduces the selected thumbnail image Tp and encloses the reduced thumbnail image Tpx in a bubble Bb, thereby displaying the reduced thumbnail image Tpx and the bubble Bb onto the second layer 200B for grouping.

By executing the above-mentioned processing operations, the portable terminal 100 can display any thumbnail image Tp onto the music list screen 200 as a subject of grouping by a simple touch operation of long press of the thumbnail image Tp subject to selection.

In addition, the portable terminal 100 displays a subject of selection onto the lower first layer 200A and a subject of grouping selected from the first layer 200A onto the upper second layer 200B.

The above-mentioned configuration allows the portable terminal 100 to display subjects of selection onto the entire music list screen 200 and, at the same time, display the selected subjects of grouping onto the entire music list screen 200, thereby allowing the user to efficiently execute a grouping operation.

Further, as described above, the portable terminal 100 divides the music list screen 200 into the first layer 200A for displaying subjects of selection and the second layer 200B for displaying subjects of grouping selected from the first layer 200A.

Then, in response to a drag operation done on the music list screen 200, the portable terminal 100 scrolls only the display contents of the first layer 200A.

The configuration described above allows the user to scroll the display contents of the first layer 200A while always checking selected subjects of grouping, thereby searching for a desired subject of selection.

According to the configuration described above, the portable terminal 100 can display subjects of selection onto the entire music list screen 200 and, at the same time, selected subjects of grouping, thereby allowing user to efficiently execute a grouping operation. Thus, in grouping files, the portable terminal 100 that is easy for the user to use can be realized.

3. Variations 3-1. Variation 1

It should be noted that, in the embodiment described above, when a thumbnail image Tp displayed on the first layer 200A is selected, a reduced thumbnail image Tpx obtained by reducing this thumbnail image Tp is enclosed in a bubble Bb to be displayed on the second layer 200B.

It is also practicable to display a reduced thumbnail image Tpx without change onto the second layer 200B without enclosing in a bubble Bb.

Figure 14A:
FIGS. 14A, 14B, and 14C are schematic diagrams illustrating other display examples of selected thumbnail images.

In addition, as shown in FIG. 14A, a reduced thumbnail image Tpx may be manipulated so as to make the reduced thumbnail image Tpx look three-dimensional for example, thereby displaying the three-dimensional reduced thumbnail image onto the second layer 200B that can be easily recognizable from a thumbnail image Tp displayed on the first layer 200A.

In these cases, a drag operation with the outside of the reduced thumbnail image Tpx specified as a start location scrolls the display contents of the first layer 200A. Further, when a reduced thumbnail image Tpx is moved by a drag operation to a location where the reduced thumbnail image overlaps (or touches) another reduced thumbnail image Tpx and then the drag operation is released, these two overlapping reduced thumbnail images Tpx are grouped.

Figure 14B:
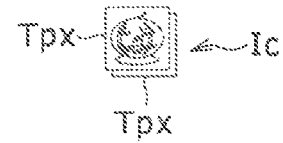

At this time, as shown in FIG. 14B for example, the grouped reduced thumbnail images Tpx may be overlapped to be handled as one icon Ic that can be operated in the same manner as a bubble Bb.

In this case, when icon Ic is tapped for example, the CPU 110 displays an icon detail screen instead of the bubble detail screen. On this icon detail screen, the reduced thumbnail images Tpx grouped by icon Ic are collectively displayed in a state these reduced thumbnail images do not overlap each other.

Then, when a desired reduced thumbnail image Tpx has been moved by a drag operation to a location separated away from another reduced thumbnail image Tpx by a predetermined distance or more, this reduced thumbnail image Tpx may be removed from the current group.

It is also practicable to display a thumbnail image Tp selected from the first layer 200A onto the second layer 200B in one of various other display forms.

On the other hand, when a thumbnail image Tp has been selected from the first layer 200A, the selected thumbnail image Tp may be displayed on the second layer 200B without change or in one of various other display forms and, at the same time, this thumbnail image Tp may be deleted from the first layer 200A.

3-2. Variation 2

In the embodiment described above, reduced thumbnail images Tpx sorted in the same group are enclosed in one bubble Bb.

It is also practicable to enclose the reduced thumbnail images Tpx sorted in the same group in a string-shaped object for example. That is, it is good if the reduced thumbnail images Tpx sorted in the same group are visually recognizable.

It is also practicable for the bubble Bb to be of one of various other colors and transparencies, in addition to the light blue translucent one.

3-3. Variation 3

In the embodiment described above, long pressing a thumbnail image Tp displayed on the first layer 200A allows the selection of this thumbnail image Tp.

It is also practicable to select a thumbnail image Tp by another touch operation (a tap for example).

It is also practicable to execute the processing operations from the selection of a thumbnail image Tp to the grouping thereof in an operation method different from that of the embodiment described above. The following describes an example of such a different method.

First, the user long presses a desired thumbnail image Tp. Then, the CPU 110 recognizes that this thumbnail image Tp has been selected by the user, encloses, in a bubble Bb, a reduced thumbnail image Tpx obtained by reducing the thumbnail image Tp, and displays the enclosed reduced thumbnail image Tpx at the location (or in the proximity thereof) at which the long press operation has been done.

Further, if the user moves the touch location over another thumbnail image Tp by sliding the user's finger without detaching the user's finger from the touch screen 102, then, in accordance with this movement of the touch location, the CPU 110 moves the bubble Bb and the reduced thumbnail image Tpx enclosed therein over that another thumbnail image Tp.

It is assumed here that the user stops sliding the finger and keeps tapping this thumbnail image Tp for a predetermined time. Then, the CPU 110 recognizes that this thumbnail image Tp has been newly selected and encloses a reduced thumbnail image Tpx obtained by reducing this thumbnail image Tp in a bubble Bb displayed on the first layer 200A, and then displays the reduced thumbnail image Tpx.

As a result, the thumbnail image Tp selected this time is put in the same group as that of the thumbnail image Tp selected last.

As described above, it is practicable to repeat an operation of moving a bubble Bb over a desired thumbnail image Tp and wait for a predetermined time, thereby grouping desired thumbnail images Tp by sequentially selecting these thumbnail images in a manner of drawing a picture with a single stroke of the brush for example.

It should be noted that, in this case, the first layer 200A is searched for a desired thumbnail image Tp while moving a bubble Bb. Therefore, it is desired to execute the movement of a bubble Bb and the scroll of the first layer 200A exclusively to each other without detaching the user's finger.

To be more specific, the first layer 200A may be scrolled in the vertical direction only when a bubble Bb is located in the proximity of the upper end or the lower end of the first layer 200A, for example.

In addition, still another method is possible. For example, one empty bubble Bb is displayed on the second layer 200B in advance, for example.

Then, every time a thumbnail image Tp is selected from the first layer 200A, a reduced thumbnail image Tpx obtained by reducing the selected thumbnail image Tp is put in this bubble Bb.

In this method, only one group can be handled but an operation of linking bubbles Bb can be saved, thereby providing still easier grouping.

3-4. Variation 4

In the embodiment described above, the display locations of reduced thumbnail images Tpx enclosed in a bubble Bb are adjusted so as to prevent overlapping only on the bubble detail screen 201.

It is also practicable to adjust the display locations of reduced thumbnail images Tpx enclosed in a bubble Bb are also adjusted so as to prevent overlapping on the music list screen 200.

For example, upon returning from the bubble detail screen 201 to the music list screen 200, the display location of the thumbnail image Tp in a bubble Bb is adjusted to the same display location adjusted on the bubble detail screen 201.

This configuration allows the user to easily check each of the reduced thumbnail images Tpx enclosed in a bubble Bb also on the music list screen 200.

It is also practicable to adjust the display locations of the reduced thumbnail images Tpx enclosed in bubbles Bb every time these bubbles are linked with each other on the music list screen 200.

It should be noted that, in adjusting the display locations of the reduced thumbnail images Tpx in bubbles, most of the music list screen 200 may be occupied by the reduced thumbnail images Tpx depending on the number of the reduced thumbnail images Tpx enclosed in bubbles Bb.

Figure 14C:
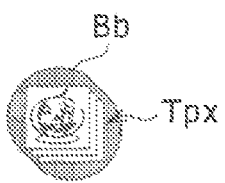

Therefore, it is desired to switching between the case where the reduced thumbnail images Tpx in bubbles Bb are displayed not overlapped and the case where the reduced thumbnail images Tpx enclosed in bubbles Bb are overlapped to be displayed as small as possible as shown in FIG. 14C.

To be more specific, every time a bubble Bb is double tapped, these two cases may be switched between each other.

3-5. Variation 5

In the embodiment described above, when a bubble Bb is tapped, the bubble detail screen 201 indicative of the details of the tapped bubble Bb is displayed on the touch screen 102 instead of the music list screen 200.

It is also practicable to change the display of the second layer 200B to the display of the bubble detail screen 201 when a bubble Bb is tapped.

To be more specific, when a bubble Bb is tapped, the second layer 200B is made opaque (or translucent) and another displayed bubble Bb and the reduced thumbnail images Tpx are hidden (or displayed in gray).

Then, the display locations of the reduced thumbnail images Tpx enclosed in the tapped bubble Bb are adjusted so as not to overlap each other.

Further, each of the reduced thumbnail images Tpx in a bubble Bb can be removed by a drag operation independently of the other reduced thumbnail images Tpx in the bubble Bb.

Then, when the bubble Bb is tapped, the display of the second layer 200B is returned to the original display as with returning from the bubble detail screen 201 to the music list screen 200.

This configuration allows the second layer 200B to function in the same manner as the bubble detail screen 201.

3-6. Variation 6

In the embodiment described above, after moving a reduced thumbnail image Tpx enclosed in a bubble Bb to the outside of this bubble Bb on the bubble detail screen 201, this reduced thumbnail image Tpx is enclosed in a new bubble Bb to separate this reduced thumbnail image from the former bubble Bb.

It is also practicable to delete the reduced thumbnail image Tpx moved to the outside of a bubble Bb from the bubble detail screen 201 and, at the same time, release the selection of the thumbnail image Tp corresponding to this reduced thumbnail image Tpx.

In this case, this reduced thumbnail image Tpx is deleted also from the second layer 200B.

It is still also practicable to separate the bubble Bb not only on the bubble detail screen 201 but also on the music list screen 200 in response to a pinch-out operation done by the user.

In this case, a pinch-output operation is executed by touching a reduced thumbnail image Tpx to be moved to the outside of the bubble Bb with one finger and, at the same time, sliding the other finger away from the touching finger with the other finger touching another location in the bubble Bb. Then, the CPU 110 encloses the reduced thumbnail image Tpx touched with one finger in a new bubble Bb to separate from the former bubble Bb.

It is also practicable to link bubbles Bb by a pinch-in operation. In this case, with two fingers touching different bubbles Bb respectively, the two fingers are slid closer to each other for a pinch-in operation. Then, the CPU 110 links the bubbles Bb touched by the two fingers.

3-7. Variation 7

In the embodiment described above, no method is described in which once selected thumbnail image Tp is deselected.

However, like variation 5 described above for example, once selected thumbnail image Tp can be deselected.

Instead of delete area Ar2, a deselection area may be displayed on the second layer 200B, for example. A bubble Bb is moved into this deselection areas to deselect the selection of the thumbnail image Tp corresponding to a reduced thumbnail image Tpx enclosed in this bubble Bb.

When a bubble Bb is double-tapped, animation may be displayed such that this bubble Bb explodes, thereby deselecting the selection of the thumbnail image Tp corresponding to a reduced thumbnail image Tpx enclosed in this bubble Bb, for example.

Further, the selection of a thumbnail image Tp may be deselected by touch operations other than those mentioned above.

3-8. Variation 8

In the embodiment described above, reproduction area Ar1 and delete area Ar2 are displayed on the second layer 200B only while a bubble Bb displayed on the second layer 200B is touched.

It is also practicable to display reproduction area Ar1 and delete area Ar2 always on the second layer 200B or only under certain conditions, for example.

Only while a bubble Bb displayed on the second layer 200B is touched, the transparency of the second layer 200B may be lowered or the color of the second layer 200B may be changed from no-color to grey for example.

In the embodiment described above, the second layer 200B is transparent and colorless, but it is not limitative. It is practicable to change the color and transparency of the second layer 200B in a range in which the display contents of the first layer 200A can be recognized.

3-9. Variation 9

In the embodiment described above, the present disclosure is applied to the portable terminal 100 having the touch screen 102 as an operation device.

It is also practicable to apply the present disclosure to information processing apparatuses having various other operation devices.

An operation device and a display device may be separately arranged or an external display device may be connected on any information processing apparatus having an operation device other than the touch screen 102.

In the embodiment described above, a thumbnail image Tp for each music file is displayed on the first layer 200A as the information subject to selection and this thumbnail image Tp is grouped.

It is also practicable to display various other items of information onto the first layer 200A as subjects of selection for grouping.

It should be noted that the operations to be executed in the embodiment and variations thereto described above are illustrative only; actually, these operations may be defined by designers appropriately.

3-10. Variation 10

In the embodiment described above, the portable terminal 100 has the touch screen 102 made up of the liquid crystal panel 102A and the touch panel 102B based on electrostatic capacitance.

It is also practicable to arrange a liquid crystal display incorporating a touch panel function onto the portable terminal 100 instead of the touch screen 102.

In addition, the liquid crystal panel 102A may be replaced with another type of display, such as an EL (Electroluminescence) display, for example 3-11. Variation 11

In the embodiment described above, the portable terminal 100 as an information processing apparatus has the touch screen 102 for an operator block and a display block and the CPU 110 for a control block.

It is also practicable to configure the above-mentioned functions (the operator block, the control block, and the display block) of the portable terminal 100 by various other hardware components if the similar functions are provided.

3-12. Variation 12

In the embodiment described above, programs for executing various processing operations are written to the volatile memory 111 of the portable terminal 100 in advance.

It is also practicable to arrange a slot for accommodating a storage medium, such as a memory card, on the portable terminal 100, for example. Programs are read for execution by the CPU 110 from the storage medium loaded in this slot. Also, the CPU 110 may install programs read from this storage medium into the volatile memory 111. In addition, the CPU 110 may download these programs from a device on a network via the network interface 114 and install the downloaded programs into the volatile memory 111.

3-13. Variation 13

Further, the present disclosure is not limited to the embodiment and variations thereto described above. Namely, the present disclosure is also applicable to a form in which the embodiment described above and a part or all of the variations thereto are combined or a form in which parts are extracted from the embodiment and variations thereto.

The present embodiment is widely usable in information processing apparatuses having GUI, for example.

For example, the present technology can adopt the following configurations.

(1) An information processing apparatus including:
an operator block; and
a control block configured to display, on a display block, a screen made up of a first layer that is displayed in a state where information is capable of being selected and a second layer, superimposed on the first layer, for grouping selected information, the second layer being one of two states of being transparent and translucent;
wherein, when information displayed on the first layer is selected through the operator block, the control block displays the selected information on the second layer, thereby making the displayed information subject to grouping.

(2) The information processing apparatus according to the (1), wherein the operator block can execute operation input by a touch operation.

(3) The information processing apparatus according to the (2), if the information displayed on the first layer is kept touched for a predetermined time, the control block determines that the information has been selected.

(4) The information processing apparatus according to any one of the (1) to (3), wherein, if the information displayed on the first layer is selected through the operator block, the control block reduces the selected information and displays the reduced information as enclosed in an object representing a group.

(5) The information processing apparatus according to any one of the (1) to (4), wherein the control block moves the object on the second layer along with the information enclosed in the object in response to a drag operation with a location inside the object displayed on the second layer specified as an origin of the drag operation.

(6) The information processing apparatus according to any one of the (1) to (5), wherein the control block scrolls only display contents of the first layer in response to a drag operation with a location outside the object displayed on the second layer specified as an origin of the drag operation.

(7) The information processing apparatus according to any one of the (1) to (6), wherein the control block moves the object displayed on the second layer in response to a drag operation and, when the object at least comes in contact with another object displayed on the second layer, links these two objects each other to sort the information enclosed in the two objects into one group.

(8) The information processing apparatus according to any one of the (1) to (7), wherein, when an object displayed on the second layer is selected through the operator block and, if the object encloses a plurality of items of information, the control block adjusts display locations of the plurality of items information so as not to overlap each other.

(9) The information processing apparatus according to any one of the (1) to (8), wherein the control block provides an area corresponding to a predetermined instruction on the second layer and, when an object displayed on the second layer is moved into the area by a drag operation, executes processing corresponding to the instruction related with the area onto the information enclosed in the object.

(10) The information processing apparatus according to any one of the (1) to (9), wherein, when a drag operation with information enclosed in the object specified as an origin of the drag operation is executed with the object selected, the control block moves the information in response to the drag operation and, when the information has been moved to the outside of the object, removes the information from a group of the object.

(11) The information processing apparatus according to any one of the (1) to (10), wherein the control block moves the information displayed on the second layer on the second layer in response to a drag operation with the information specified as an origin of the drag operation.

(12) The information processing apparatus according to any one of the (1) to (11), wherein the control block scrolls only display contents of the first layer in response to a drag operation with a location separate from the information displayed on the second layer specified as an origin of the drag operation.

(13) The information processing apparatus according to any one of the (1) to (12), wherein the control block moves the information displayed on the second layer in response to a drag operation and, when the information at least comes in contact with another item of information displayed on the second layer, sorts these two items of information into one group.

(14) The information processing apparatus according to any one of the (1) to (13), wherein, in response to a drag operation, the control block moves one of a plurality of items of information sorted in one group and displayed on the second layer and, when the one of a plurality of items of information has been separated from another item of information sorted in the one group by a predetermined distance, removes the one of a plurality of items of information from the one group.

(15) An information processing method including:
displaying by a control block, on a display block, a screen made up of a first layer that is displayed in a state where information is capable of being selected and a second layer, superimposed on the first layer, for grouping selected information, the second layer being one of two states of being transparent and translucent;
wherein, when information displayed on the first layer is selected through an operator block, the control block displays the selected information on the second layer, thereby making the displayed information subject to grouping.

(16) An information processing program for causing an information processing apparatus to execute:
displaying by a control block, on a display block, a screen made up of a first layer that is displayed in a state where information is selected and a second layer, superimposed on the first layer, for grouping selected information, the second layer being one of two states of being transparent and translucent;
wherein, when information displayed on the first layer is selected through an operator block, the control block displays the selected information on the second layer, thereby making the displayed information subject to grouping.

What is claimed is:

1. An apparatus, comprising:
a display control circuit configured to:
control a display of a plurality of objects in a first display layer,
receive a first selection of a first object of the plurality of objects as a first selected object,
receive a second selection of a second object of the plurality of objects as a second selected object,
display a first reduced object in response to the reception of the first selection, wherein the first reduced object is the first selected object at a reduced size, within a first selection bubble in a second display layer, wherein the second display layer is above the first display layer,
display a second reduced object in response to the reception of the second selection, wherein the second reduced object is the second selected object at a reduced size, within a second selection bubble in the second display layer,
move the first reduced object and the second reduced object independently from one another within the second display layer when the display control circuit receives a move command,
and
scroll the first display layer that includes the plurality of objects without scroll or movement of the objects displayed on the second display layer,
wherein the first reduced object and the second reduced object are dragged to form a first reduced object group within a third selection bubble in the second display layer,
wherein when the first reduced object and the second reduced object are grouped in the first reduced object group, the display control circuit is configured to display the first reduced object group within the third selection bubble,
wherein, when a scroll command is received by a user input, at a start location inside of an object out of the first reduced object or the second reduced object in the third selection bubble, to drag the object outside the third selection bubble, a fourth selection bubble is displayed containing the object dragged from the third selection bubble in response to the scroll command.

2. The apparatus according to claim 1, wherein
the second display layer is superimposed on the first display layer,
the second display layer is configured to display selected objects in the second display layer, wherein the selected objects are objects selected from the plurality of objects displayed on the first display layer, and
the second display layer is transparent or translucent.

3. The apparatus according to claim 2, wherein the display control circuit is further configured to scroll the second display layer that includes the first reduced object, the second reduced object, the first selection bubble and the second selection bubble, without movement of the plurality of objects displayed on the first display layer.

4. The apparatus according to claim 3, wherein the display control circuit is further configured to scroll the second display layer that includes the first reduced object, the second reduced object, the first selection bubble and the second selection bubble when a scroll command is received, the scroll command received by a user input with a start location inside the first selection bubble or inside the second selection bubble.

5. The apparatus according to claim 2, wherein the second display layer is configured to display a first area and a second area, wherein the first area and the second area are displayed horizontally in a bottom section of the second display layer when the first selection bubble or the second selection bubble is selected by the user.

6. The apparatus according to claim 5, wherein the display control circuit is configured to reproduce the first reduced object inside the first selection bubble or the second reduced object inside the second selection bubble when the first selection bubble or the second selection bubble is moved to the first area; and
the display control circuit is configured to delete the first reduced object inside the first selection bubble or the second reduced object inside the second selection bubble when the first selection bubble or the second selection bubble is moved to the second area.

7. The apparatus according to claim 1, wherein the display control circuit is further configured to scroll the first display layer without the scroll or the movement of the objects displayed on the second display layer when a scroll command is received, the scroll command received by a user input with a start location outside of the first selection bubble and the second selection bubble.

8. The apparatus according to claim 1, wherein the first selection bubble is in the shape of a circle.

9. The apparatus according to claim 1, wherein the display control circuit is configured to merge the first selection bubble and the second selection bubble into the third selection bubble when a command is received to move the first reduced object and the second reduced object onto a same location.

10. The apparatus according to claim 1, wherein the display control circuit is further configured to display the first selected object in the first display layer and to simultaneously display the first reduced object in the second display layer.

11. The apparatus according to claim 10, wherein the display control circuit is further configured to group the first reduced object and the second reduced object in the second display layer.

12. The apparatus according to claim 1, further comprising a touch panel, wherein
the display control circuit is configured to receive the first selection, the second selection and the move command via operation of the touch panel by a user.

13. The apparatus according to claim 1, wherein the display control circuit is further configured to
group the first reduced object and the second reduced object when the first reduced object is moved within the second selection bubble, or
the second reduced object is moved within the first selection bubble.

14. The apparatus according to claim 13, wherein the display control circuit is further configured to
move the first reduced object group when the display control circuit receives a move command and the first reduced object group is selected.

15. The apparatus according to claim 1, wherein
each object of the plurality of objects includes an icon and text, the icons and text displayed in the first display layer,
the first reduced object is the icon of the first selected object at a reduced size, and
the second reduced object is the icon of the second selected object at a reduced size.

16. The apparatus according to claim 1, wherein
when the first reduced object is selected and the second reduced object is unselected, the first reduced object and the first selection bubble are moved in the second display layer without movement of the second reduced object and the second selection bubble in the second display layer, and
when the second reduced object is selected and the first reduced object is unselected, the second reduced object and the second selection bubble are moved in the second display layer without movement the first reduced object and the first selection bubble in the second display layer.

17. A method comprising:
controlling, by a display control circuit, a display of a plurality of objects in a first display layer;
receiving a first selection of a first object of the plurality of objects as a first selected object;
receiving a second selection of a second object of the plurality of objects as a second selected object;
displaying a first reduced object in response to the reception of the first selection, wherein the first reduced object is the first selected object at a reduced size, within a first selection bubble in a second display layer, wherein the second display layer is above the first display layer,
displaying a second reduced object in response to the reception of the second selection, wherein the second reduced object is the second selected object at a reduced size, within a second selection bubble in the second display layer,
moving the first reduced object and the second reduced object independently from one another within the second display layer when the display control circuit receives a move command; and
scrolling the first display layer that includes the plurality of objects without moving or scrolling the objects displayed on the second display layer,
wherein the first reduced object and the second reduced object are dragged to form a first reduced object group within a third selection bubble in the second display layer,
wherein when the first reduced object and the second reduced object are grouped in the first reduced object group, displaying the first reduced object group within the third selection bubble,
wherein, when a scroll command is received by a user input, at a start location inside of an object out of the first reduced object or the second reduced object in the third selection bubble, to drag the object outside the third selection bubble, displaying a fourth selection bubble containing the object dragged from the third selection bubble in response to the scroll command.

18. A non-transitory computer readable medium encoded with a a set of instructions that, when executed by a computer, causes the computer to:
control a display of a plurality of objects in a first display layer;
receive a first selection of a first object of the plurality of objects as a first selected object;
receive a second selection of a second object of the plurality of objects as a second selected object;
display a first reduced object in response to the reception of the first selection, wherein the first reduced object is the first selected object at a reduced size, within a first selection bubble in a second display layer, wherein the second display layer is above the first display layer,
display a second reduced object in response to the reception of the second selection, wherein the second reduced object is the second selected object at a reduced size, within a second selection bubble in the second display layer,
move the first reduced object and the second reduced object independently from one another within the second display layer when the display control circuit receives a move command,
and
scroll the first display layer that includes the plurality of objects without scroll or movement of the objects displayed on the second display layer,
wherein the first reduced object and the second reduced object are dragged to form a first reduced object group within a third selection bubble in the second display layer,
wherein when the first reduced object and the second reduced object are grouped in the first reduced object group, the first reduced object group is displayed within the third selection bubble,
wherein, when a scroll command is received by a user input, at a start location inside of an object out of the first reduced object or the second reduced object in the third selection bubble, to drag the object outside the third selection bubble, a fourth selection bubble is displayed containing the object dragged from the third selection bubble in response to the scroll command.

* * * * *